United States Patent [19]

Newhart, deceased et al.

[11] 4,173,537
[45] Nov. 6, 1979

[54] INTEGRAL ARTIFICIAL KIDNEY UNIT

[76] Inventors: Earle E. Newhart, deceased, late of Newport Beach, Calif.; by Ruth Newhart, executor, 1907 Leeward La., Newport Beach, Calif. 92660

[21] Appl. No.: 799,501

[22] Filed: May 23, 1977

[51] Int. Cl.$^2$ .............................................. B01D 31/00
[52] U.S. Cl. .............................. 210/321 B; 210/323 R; 264/237; 264/331; 264/348
[58] Field of Search .................... 264/94, 96, 237, 258, 264/331, 348; 23/258.5 M; 210/321 B, 323 R, 22, 500 M

[56] References Cited

U.S. PATENT DOCUMENTS

| | | | |
|---|---|---|---|
| 3,490,523 | 1/1970 | Esmond | 23/258.5 X |
| 3,616,927 | 11/1971 | Muir | 210/321 |
| 3,660,280 | 5/1972 | Rogers | 210/321 X |
| 3,746,175 | 7/1973 | Markley | 210/321 B |
| 3,997,386 | 12/1976 | Oshida et al. | 264/348 X |

*Primary Examiner*—Frank A. Spear, Jr.
*Attorney, Agent, or Firm*—J. L. Jones, Sr.

[57] ABSTRACT

An integral artificial kidney unit is formed of four opposed plastic sheets bonded together, the composition of the inner second pair of opposed thin sheets being selected for their high permeability to waste products which are required to be dialyzed from patient blood. The inner second pair of plastic sheets are bonded together in a sealed pattern providing an integral perfusion unit. The outer first pair of plastic sheets are bonded at their exterior edges forming a dialyzate chamber and also are bonded to a blood inlet port and a blood outlet port of the enclosed integral perfusion unit. More than one perfusion unit can be interconnected in parallel to a common blood inlet port and a common blood outlet port, and all are disposed inside the dialyzate chamber. An integral perfusion unit has a single blood inlet port symetrically disposed and interconnected to a blood inlet manifold, and the inlet manifold is disposed across and interconnected to multiple parallel blood tubules having small diameters. The blood outlet manifold is disposed across and interconnected to the termini of the multiple blood tubules opposed to the tubule termini interconnected to the blood inlet manifold. A blood outlet port is interconnected to the blood outlet manifold at the manifold section opposed to the tubule termini.

The dialyzate chamber has a dialyzate inlet port and outlet port disposed to provide a uniform flow of dialyzate solution over the exterior face of the one or more integral perfusion units disposed inside the chamber.

A fabrication process for an integral artificial kidney unit is taught.

10 Claims, 8 Drawing Figures

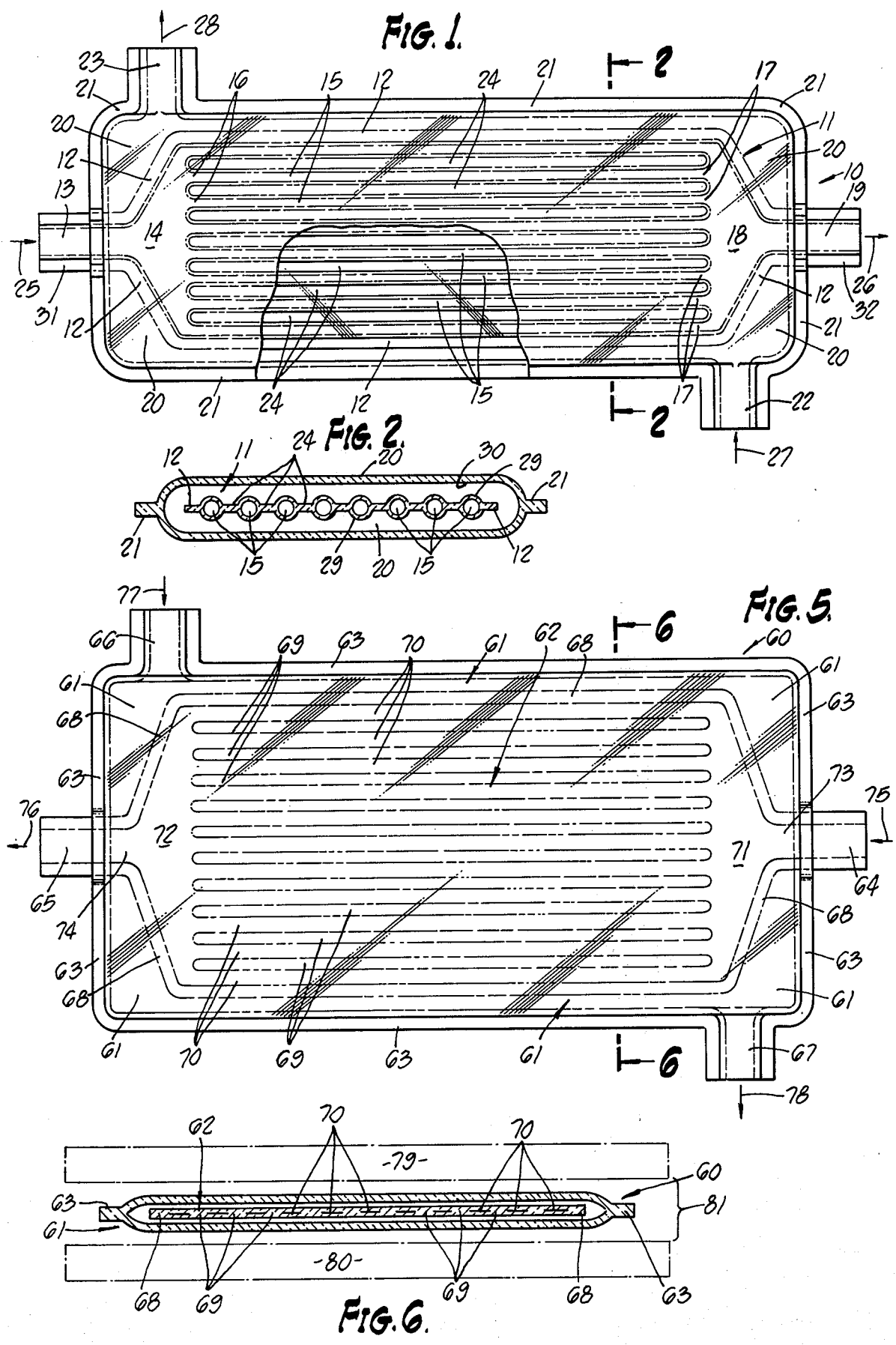

INTEGRAL ARTIFICIAL KIDNEY UNIT

BACKGROUND OF THE INVENTION

The integral artificial kidney unit of this invention is classified in Class 210, sub classes 88, 136, 257, 321 and 416.

Chronically uremic patients require frequent periodic hemodialysis treatments to remove waste products from the patient's blood. The waste products accumulate in the patient's blood due to failure of the patient's kidneys to separate and to excrete the waste products in the patient's urine.

A regenerated cellulose composition, utilized in a thin membrane sheet or tubular shape is commonly used as a semi-permeable membrane in an artificial kidney unit suitable for hemodialysis treatment. The regenerated cellulose composition formed into a thin film is not sufficiently permeable to the middle molecular weight waste solutes which should be eliminated from the blood. See B. H. Barbour, M. Bernstein, P. A. Cantor, B. S. Fisher and W. Stone, Jr. in Trans. Amer. Soc. Artif. Int. Organs, Clinical Use of NISR 440 Polycarbonate Membrane for Hemodialysis, Volume XXI, 1975. The regenerated cellulose film has the additional problem of a low burst strength. Regenerated cellulose film sheets are not easily bonded to each other to form selected sealed configurations.

An artificial kidney unit utilizing capillary fibers is described by Stewart, Barreta, Cerny, and Mahon in Investigative Urology, Volume 3, No. 6, page 614 (1966). Deacetylated cellulose acetate hollow fibers provide multiple semi-permeable membrane capillary fiber bundles sealed in header plates in a fluid exchanger shell. The patient blood circulates inside the capillary hollow fibers, and the dialysate solution circulates around the fiber exterior in the fluid exchanger shell. The fibers have a mean 90 micron inside diameter and a wall thickness of 20 micron, providing reasonably satisfactory dialysate solution-blood exchange.

In U.S. Pat. No. 3,864,256 Newhart disclosed and claimed an ambulatory hemodialyses apparatus, which can typically be connected to a femoral arteriovenous cannulae positioned on a patient thigh, providing a blood inlet conduit to the hemodialyses unit and a blood outlet conduit from the unit. A relatively small perfusion unit can provide continuous hemodialysis for an ambulatory patient over a daily time cycle.

In Barbour, Bernstein et al there is disclosed a polyetherglycol polycarbonate membrane, designated NISR 440 which has been developed by the National Institute of Scientific Research. The polycarbonate films can be bonded to each other by heat sealing means. Utilizing comparably thick polycarbonate membrane and regenerated cellulose membranes, permeability cell studies disclosed that the polycarbonate film had a urea permeability of 1.7 greater than a cellulose film, a creatinine permeability 1.9 greater than a cellulose film, and the burst strength of the polycarbonate was 1.50 to 2.0 times greater than a cellulose film. It was projected that the greater creatinine clearance of the polycarbonate film can reduce a minimum adequate dialysis time over a regenerated cellulose film to about one-half the number of dialysis hours.

SUMMARY OF THE INVENTION

An integral artificial kidney unit is formed of four opposed thin plastic sheets bonded together, the composition of the inner second pair of opposed thin sheets being selected for their high permeability to waste products which are required to be dialysed from patient blood. The inner second pair of thin plastic sheets are bonded together in a sealed pattern providing an integral perfusion unit. The outer first pair of plastic sheets are bonded at their exterior edges, and also are bonded to an external blood inlet port and an opposed blood outlet port of the enclosed integral perfusion unit, providing a dialysate chamber with an inlet and outlet dialysate port which surrounds the perfusion unit. A plurality of more than one perfusion units can be interconnected in parallel to a common blood inlet port and a common blood outlet port, and all are disposed inside the dialysate chamber. An integral perfusion unit has a single blood inlet port symetrically disposed and interconnected to a blood inlet manifold, and the inlet manifold is disposed across and interconnected to multiple parallel blood tubules having small diameters. The blood outlet manifold is disposed across and interconnected to the termini of the multiple blood tubules which are opposed to the tubule termini interconnected to the blood inlet manifold. A blood outlet port is interconnected to the blood outlet manifold at the manifold section opposed to the tubule termini. The dialysate chamber has a dialysate inlet port and outlet port disposed to provide a uniform flow of dialysate solution over the exterior face of the one or more integral perfusion units disposed in the chamber.

A fabrication process for an artificial kidney unit comprises the step of cutting and bonding together a first pair of opposed thin plastic composition sheets in a bond pattern providing flat potential blood inlet and outlet ports, flat potential inlet and outlet blood manifolds, and flat potential multiple blood tubules disposed in parallel between the pair of manifolds. A second pair of the plastic composition sheets are bonded at their area perimeter, forming an opposed flat enclosing envelope around the first pair of plastic sheets, the flat potential blood inlet and outlet ports extending exteriorly to the second pair of flat plastic sheets. The first pair of opposed sheets comprise a flat potential one or more perfusion units and the second pair of plastic sheets comprise a flat potential dialysate chamber.

Another fabrication step comprises expanding the potential dialysate chamber envelope and the potential one or more perfusion units to their respective desired volumes, utilizing the desired volumes of a heated, pressurized fluid, and then cooling the plastic sheeting to provide an integral artificial kidney unit.

Multiple perfusion units can be vertically stacked, separated by a desired volume for dialysate solution flow and the conjoining inlet ports and outlet ports bonded into a separate common inlet port and a separate common outlet port. The joined perfusion units can be enclosed in a dialysate chamber.

Included in the objects of this invention are:

To provide an effective and inexpensive artificial kidney unit suitable for patient hemodialysis.

To provide a reliable, simple artificial kidney unit whose size can be adapted to an ambulatory dialysis apparatus and also to a larger kidney unit useful in a clinical hemodialysis treatment center.

To provide a simple fabrication process for manufacturing reliable artificial kidney units, free of leakage defects.

To provide a simple hemodialysis unit utilizing a plastic composition film having a high permeability to waste products normally excreted in human urine.

Further objects and advantages of this invention will become apparent in the following description, to be read in conjunction with the accompanying drawings.

BRIEF DESCRIPTION OF THE DRAWINGS

FIG. 1 is plan partial sectional view of an integral artificial kidney unit of this invention, having a single integral perfusion unit enclosed in a dialysate chamber.

FIG. 2 is a cross section view through 2—2 of FIG. 1.

FIG. 5 is a plan view of a lay flat potential integral artificial kidney unit having one layflat potential integral perfusion unit.

FIG. 6 is a cross section view through 6—6 of FIG. 5.

DESCRIPTION OF THE PREFERRED EMBODIMENT

Figure 3:
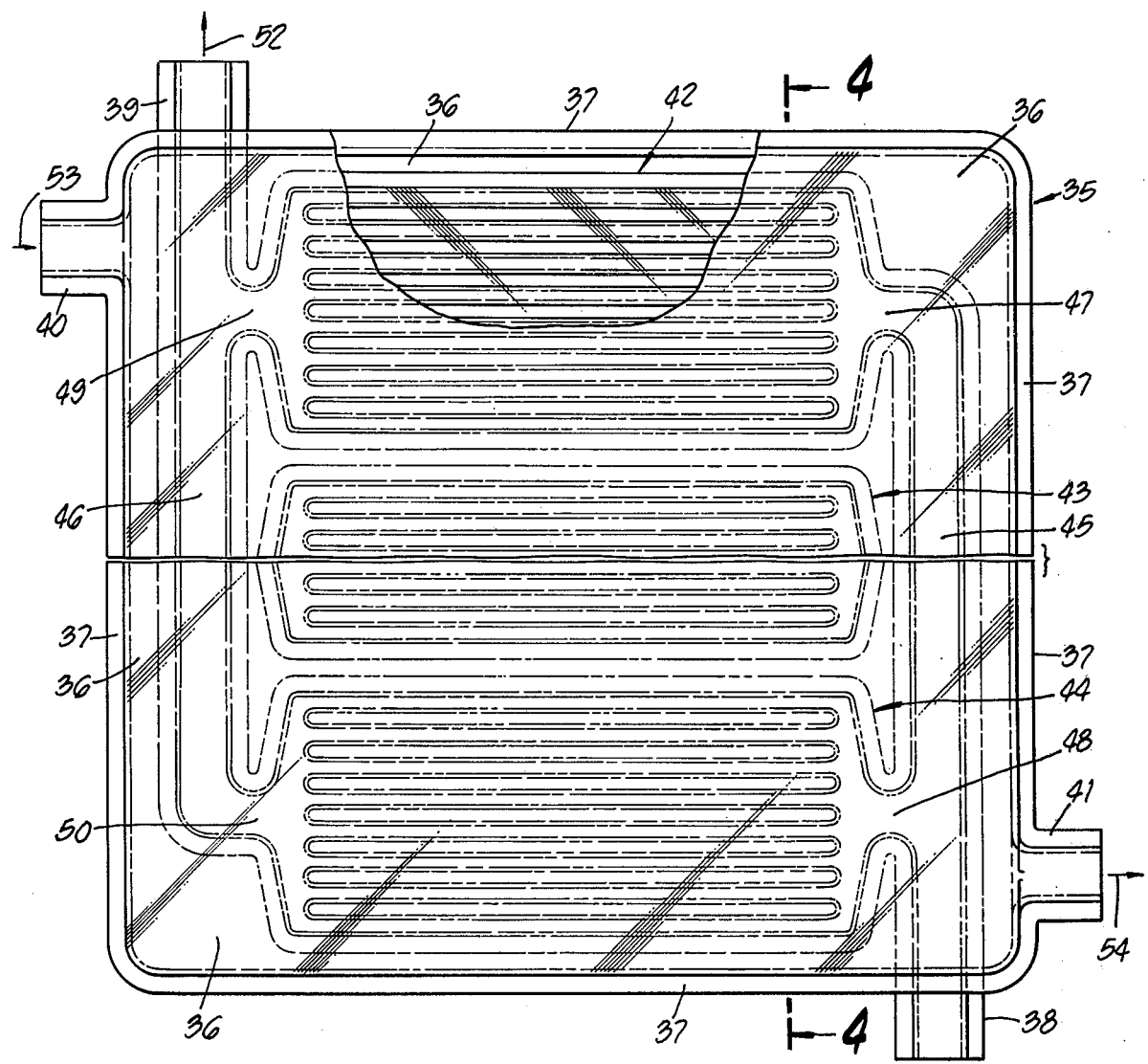
FIG. 3 is a plan partial sectional view of an integral artificial kidney unit having more than one integral perfusion unit disposed in parallel between a common blood inlet and a common blood outlet of the perfusion units.

Referring to FIGS. 1 to 8, in order to present the illustrations with clarity, there are some minor distortion of scale in the drawings, and the thin film cross sections of FIGS. 2, 4, 6 and 8 cannot be shown sized to true linear scale and are exaggerated in size.

Referring to FIGS. 1 and 2 in detail, their respective plan and sectional views disclose an integral artificial kidney 10, having an integral blood perfusion unit 11 disposed inside and enclosed by a dialysate chamber 20. The flat bonded exterior perimeter edge 21 of the dialysate chamber 20 is sealed together at the chamber perimeter, and the chamber 20 is constructed from a first pair of plastic composition sheets. The first pair of bonded sheets have the strength and rigidity to provide a protective exterior case of the kidney unit 10, and the case is typically transparently colorless, providing observation of the dialysis procedure. The dialysate chamber 20 is bonded to the opposed pair of the exterior blood inlet tube 31 and the exterior blood outlet tube 32 at the bonded perimeter 21 of the chamber 20. The dialysate chamber 20 has an opposed pair of exterior dialysate inlet port 22 and exterior outlet port 23, typically providing dialysate solution flow direction designated by arrows 27 and 28.

The integral blood perfusion unit 11 of FIGS. 1 and 2, is enclosed inside of dialysate chamber 20, and the perfusion unit 11 is interconnected by its blood inlet port 13 and blood outlet port 19 to the respective exterior blood inlet tube 31 and exterior blood outlet tube 32 of chamber 20. The perfusion unit 11 is formed of a second pair of plastic composition sheets having a high permeability to waste excreta in patient blood, the unit 11 having a flat perimeter bonded edge 12. A bonded pattern formed by the opposed thin second pair of sheets provides the multiple parallel bonded flat joints 24 and the multiple parallel blood tubules 15 of small diameter. The joints 24 are alternately disposed between multiple blood tubules 15.

The blood inlet port 13 is centrally interconnected to the blood inlet manifold 14, which is disposed across and interconnected to the multiple parallel blood tubules 15. The inlet tubule termini 16 interconnect to manifold 14. A blood outlet manifold 18 is disposed across and interconnected to the termini 17 of the blood tubules 15 opposed to the blood inlet manifold 14. The blood flow is typically in the arrow direction 25 into exterior blood inlet tube 31, through the inlet port 13, into the interconnected blood inlet manifold 14, which distributes the blood through the multiple blood tubules 15. The blood flows out through the blood outlet manifold 18, thence through the blood outlet port 19, and the exterior blood outlet tube 32, in the arrow direction 26.

The volume and distance spacing between the interior face 30 of the dialysate chamber 20 and the exterior face 29 of the perfusion unit 11, as shown in FIG. 2, are those values which promote and optimize the rate of diffusion of waste products out of the patient blood, when the blood is circulated in the perfusion unit 11 and dialysate solution is circulated in the dialysate chamber 20 of the kidney unit 10. The spacing between 29 and 30 is exaggerated in FIG. 2. The multiple blood tubules 15 have a typical tubular diameter range of 2–5 mm. A single blood tubule of a tubular diameter of 2.0 mm by 30 cm. length can contain approximately one ml, and a perfusion unit having 20 tubules can contain 19 ml of blood in the tubules, exclusive of the volume of the manifolds 14 and 18, the blood ports 13 and 19, and the inlet and outlet tubes 31 and 32, respectively. The specific number of blood tubules and the tubule length of a perfusion unit 11 can be the required values, and the tubule diameter can be varied as required.

Figure 4:
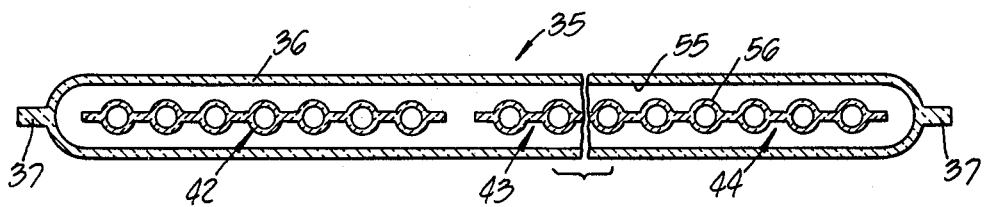
FIG. 4 is a cross section view through 4—4 of FIG. 3.

Referring to FIGS. 3 and 4 together, a further modification of the invention is disclosed and taught wherein the integral artificial kidney unit 35 has a first pair of plastic composition sheets formed into a dialysate chamber 36 having a flat bonded sheet perimeter 37. The chamber 36 has a pair of opposed exterior blood inlet tube 38 and exterior blood outlet tube 39, integrally formed and bonded into the flat edge perimeter 37. A pair of apertures directly interconnected to the interior of the dialysate chamber 36 are the exterior dialysate solution inlet port 40 and the exterior dialysate solution outlet port 41. A first integral blood perfusion unit 42, a second blood perfusion unit 43, and the final select number of blood perfusion units including the perfusion unit 44 are disposed and interconnected in parallel to a common blood inlet tube 45 and a common blood outlet tube 46 disposed inside of the dialysate chamber 36.

The units 42, 43, 44 and the like are equivalent in construction and inventive advance to the integral blood perfusion unit 11, taught and disclosed in FIGS. 1 and 2 and the specification above. The perfusion units 42, 44 and the like are shown to have the respective blood inlet ports 47 and 48 integrally interconnected to the common blood inlet tube 45. The perfusion units 42, 44 and the like are shown to have the respective blood outlet ports 49 and 50 interconnected to the common blood outlet tube 46. The arrows 51 and 52 indicate the direction of blood flow in the kidney unit 35. The arrows 53 and 54 indicate the preferred counterflow direction of dialysate solution flow into the dialysate chamber 36 and out of the chamber.

The section view of FIG. 4, greatly enlarged in cross section for illustrative purpose, shows the kidney unit 35 having a dialysate chamber 36 sealed and bonded flat at the chamber perimeter 37. The integral blood perfusion units 42, 43 and 44 are shown partially or completely in cross-sectional view to be equivalent to the construction of blood perfusion unit 11. The volume and distance spacing between the inside face 55, of the dialysate chamber 36, and the exterior face 56 of the typical perfusion unit 44 is that value needed to provide the required velocity of dialysate solution flow over the exterior of the perfusion unit 44, providing an optimum rate of diffusion of waste excreta products from the blood into the dialysate.

FIGS. 5 and 6 together illustrate an integral layflat potential artificial kidney unit 60 comprising a layflat potential dialysate solution chamber 61, which encloses a layflat potential integral blood perfusion unit 62. The chamber 61 and blood perfusion unit 62 are integrally sealed at the required junctions into a single kidney unit 60. An opposed first pair of layflat plastic composition sheets are bonded together at all the opposed sheet flat perimeter 63, excluding the opposed pair of exterior layflat potential blood inlet tube 64 and exterior layflat potential blood outlet tube 65. The opposed pair of apertures in the potential dialysate chamber 61 are directly connected to the pair of exterior layflat potential dialysate inlet port 66 and outlet port 67. The layflat potential integral blood perfusion unit 62 is fabricated of a second pair of thin plastic composition sheets having a high permeability to waste excreta products in patient blood, the pair of thin sheets being flat bonded together at its exterior edges, providing a flat edge bonded perimeter 68. The second pair of thin plastic sheets are bonded by multiple parallel longitudinal sealed areas 69, spaced a selected distance apart and providing the alternate multiple potential layflat parallel blood tubules 70. The potential tubules 70 have a potential layflat blood inlet manifold 71 interconnectingly disposed between one set of tubule termini and a potential layflat blood inlet port 73. The multiple tubules 70 have a potential layflat blood outlet manifold 72 interconnectingly disposed at the tubule termini opposed to manifold 71. A potential layflat blood outlet port 74 interconnects to the manifold 72. The potential blood inlet port 73 is integrally interconnected to potential layflat blood inlet tube 64, and the potential blood outlet port 74 is integrally interconnected to potential layflat blood outlet tube 65. The arrows 75 and 76 indicate the direction of potential blood flow, and the arrows 77 and 78 indicate the direction of potential dialysate solution flow.

A fabrication process for artificial kidneys of the constructions illustrated in FIGS. 1, 2, 3 and 4 is taught. The kidney 10 of FIGS. 1, or the like unit, can be fabricated from the integral layflat potential kidney unit 60 of FIGS. 5 and 6, or the like unit. As an example, the bonded unit 60 is heated, thermally as in an oven or heated by microwave, and placed between expansion plates 79 and 80 having a selected gap spacing thickness of 81. The integral layflat potential perfusion unit 61, is expanded to the selected gap spacing thickness 81 by introducing a selected volume of heated and pressurized water through inlet tube 64 or outlet tube 65 into the perfusion unit 62 at a controlled flow rate, expanding the interconnected layflat potential 64, 65, 73, 74, 71, 72, multiple 70, to a thickness 81. The perfusion unit 62 is then quickly chilled, and becomes rigid. The heated layflat potential dialysate chamber 61 is then expanded by injecting a selected volume of heated and pressurized water into the chamber 61 at a controlled flow rate, expanding the chamber 61 to a thickness controlled by a newly set gap thickness 81", and then chilled. The potential dialysate chamber 61 is expanded to a dialysate chamber such as 20, 36 or the like, and potential perfusion unit 62 is expanded to perfusion units such as 11, 42, 43, 44 or the like, as required.

Utilizing the above taught fabrication method, it is possible to quickly manufacture a relatively low cost artificial kidney unit, and also to separately manufacture one or more integral perfusion units, disposed in parallel where required.

Figure 7:
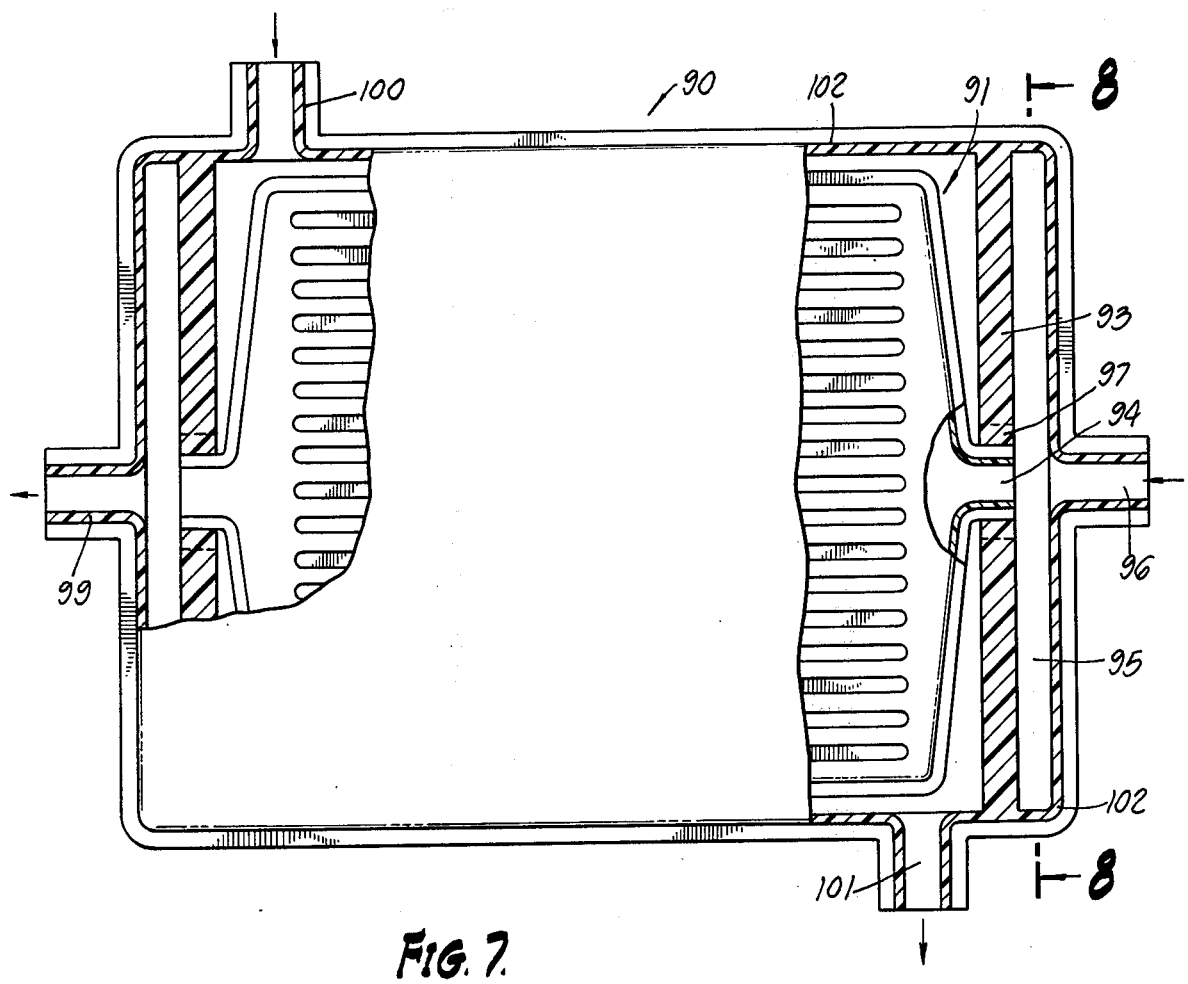
FIG. 7 is a partially sectional and plan view of another kidney dialysis unit utilizing the multiple integral perfusion units.
Figure 8:
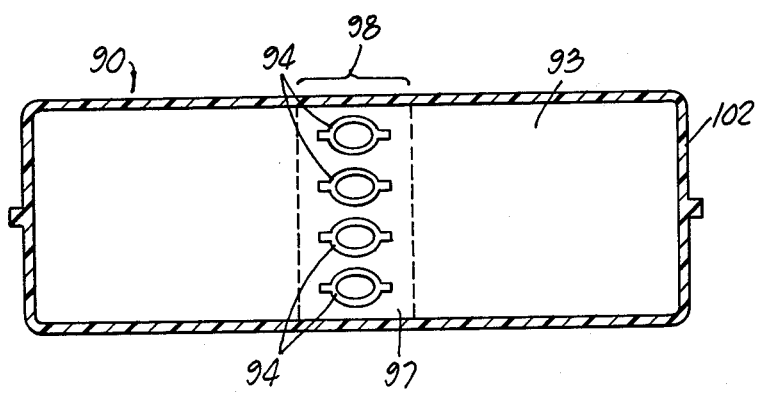
FIG. 8 is a cross section view through 7—7 of FIG. 7.

Referring to FIGS. 7 and 8 together in detail, a multiple of two or more perfusion units of the construction of 11, 42, 43, 44 and the like can be disposed in a vertical multiple stack. The number of stacked perfusion units 91 or the like disposed in the artificial kidney unit 90, is illustrated with four units, and the number of perfusion units 91 or the like can be the number required for the use of a patient scheduled for dialysis treatment on a specific treatment time cycle. The multiple perfusion units 91 are each secured in parallel in a header plate 93, bonding a blood port 94 or the like. The exterior case 102 of the kidney unit 90 has an exterior blood collector tube 96, which is interconnected to the blood manifold 95. The manifold 95 is interconnected to the parallel multiple ports 94. The multiple ports 94 are bonded securely in a slot 97 in the header plate 93, and secured by a fluid impermeable bond in the slot 97 around the exterior of each port 94, by a solid bonding composition of width 98. The header plate 93 has an equivalent header plate structure at the opposed terminus inside the kidney unit 90 adjacent to the blood collecting tube 99. The opposed exterior dialysate solution tubes 100 and 101 provide means for circulating dialysate solution around the exterior of the multiple perfusion units 91, as in the kidneys 10, 60 and the like. The case 102 can be molded in one or more plastic components, having unfilled slots corresponding to the unfilled slot equivalent of 97, and then bonded together after partial assembly.

It is obvious that the cross section of tube 96 is equivalent to the sum of cross section of the multiple ports 94 if blood velocity is to be kept constant. Likewise the cross section of port 94 is equivalent in cross section to the sum of the areas of the multiple blood tubules of the perfusion unit 91 for a constant velocity of blood flow.

The thin sheet plastic composition from which the perfusion units 10, 42, 43, 44 and the layflat potential perfusion unit 61 are fabricated is a plastic composition having a high permeability to the waste products normally excreted in human urine. The waste products encompass urea, creatinine, uric acid, middle molecular weight (1000–5000 M.W.) organic excreta products and inorganic salts and the like. A polycarbonate resin designated 440 Polycarbonate by the National Institute of Scientific Research is a suitable thermoplastic resin of suitable permeability values and rigidity. Other thermoplastic resins of similar or improved solute permeability and non-toxicity in a dialysis treatment can be utilized in fabricating the integral perfusion unit in particular. The fabrication process disclosed and taught herein requires that the plastic composition of the dialysate chamber and the blood perfusion unit be compatible on heat sealing, or on adhesively bonding.

The wall thickness of the second pair of opposed 440 Polycarbonate film fabricated into the typical perfusion unit 11, 42, 43 and 44 or the like is 20–30 microns (0.020–0.030 mm) after expansion into blood tubules 2–3 mm in diameter. Prior to the expansion step, the layflat potential blood tubules 70 or the like can be constructed from a plastic film thickness ($\pi/2 \times$ tubule diameter) or 30–50 micron thick. The thickness of the dialysate chamber opposed pair of construction film can be 1–3 mm thickness or the like. A transparent plastic composition is preferred for better observation of blood flow.

Other modifications in the integral artificial kidney unit of this invention can be made in the light of my teaching. It is understood that within the scope of the claim, the invention can be practiced otherwise than as specifically described.

I claim:

1. An integral artificial kidney unit, the unit combination comprising:

a dialysate solution chamber having an opposed first pair of plastic composition sheets bonded together at all the opposed sheet perimeter, excluding the opposed sheet perimeter bonded to an opposed pair of an exterior blood inlet tube and an exterior blood outlet tube projecting outside said sheet perimeter, and having an opposed pair of apertures in said dialysate chamber directly connected to the pair of exterior dialysate inlet and exterior dialysate outlet ports; and, at least two integral perfusion units enclosed inside of said dialysate chamber, each one of said at least two perfusion units being interconnected in parallel to a common blood inlet tube and a common blood outlet tube disposed inside said dialysate chamber, aforesaid common blood inlet tube and common blood outlet tube being connected to the respective exterior blood inlet tube and aforesaid exterior blood outlet tube projecting outside of said dialysate chamber, each one of said at least one perfusion units having a second pair of opposed thin plastic composition sheets bonded together in a desired pattern including its exterior edges, each one of said perfusion units having an integral interconnecting blood inlet port disposed and interconnected to a blood inlet manifold, said inlet manifold being disposed across and interconnected to multiple parallel blood tubules having small diameters, a blood outlet manifold being disposed across and interconnected to the termini of the blood tubules opposed to the blood inlet manifold, a blood outlet port being interconnected to the blood outlet manifold at the manifold section opposed to the tubule termini, each one of said perfusion units having their respective blood inlet ports interconnected in parallel to said common blood inlet tube and having their respective blood outlet ports interconnected in parallel to said common blood outlet tube, aforesaid second pair of thin plastic composition sheets having a high permeability to waste excreta products in patient blood.

2. In the combination set forth in claim 1, the further modification wherein said dialysate chamber and said at least two integral perfusion units are proportioned in volume and disposed in space to have a thin film spacing between the inner face of said dialysate chamber and the exterior faces of said at least two integral perfusion units.

3. An integral artificial kidney unit, the unit combination comprising:

a dialysate solution chamber having an opposed first pair of plastic composition sheets bonded together at all the opposed sheet perimeter, excluding the opposed sheet perimeter bonded to an opposed pair of an exterior blood inlet tube and an exterior blood outlet tube projecting outside said sheet perimeter, and having an opposed pair of apertures in said dialysate chamber directly connected to the pair of exterior dialysate inlet and exterior outlet dialysate ports;

an integral perfusion unit enclosed inside of said dialysate chamber, said perfusion unit having a second pair of opposed thin plastic composition sheets bonded together in a desired pattern including its exterior edges, said perfusion unit having an integral interconnecting blood inlet port disposed and interconnected to a blood inlet manifold, said inlet manifold being disposed across and interconnected to multiple parallel blood tubules having small diameters, a blood outlet manifold being disposed across and interconnected to the termini of the blood tubules opposed to the blood inlet manifold, a blood outlet port being interconnected to the blood outlet manifold at the manifold section opposed to the tubule termini, said perfusion unit having its respective blood inlet port interconnected to said exterior blood inlet tube and having its respective blood outlet port interconnected to said exterior blood outlet tube, aforesaid second pair of thin plastic composition sheets having a high permeability to waste excreta products in patient blood.

4. In the combination set forth in claim 3, the further modification wherein said dialysate chamber and said integral perfusion unit are proportioned in volume and disposed in space to provide a thin film spacing between the inner face of said dialysate chamber and the exterior face of said perfusion unit.

5. An integral layflat potential artificial kidney unit, the unit combination comprising:

a layflat potential dialysate solution chamber having an opposed first pair of layflat plastic composition sheets bonded together at all the opposed sheet perimeter, excluding the opposed sheet perimeter bonded to an opposed pair of exterior layflat potential blood outlet tubes and layflat potential blood inlet tube, projecting outside said sheet perimeter, and having an opposed pair of apertures in said potential dialysate chamber directly connected to the pair of exterior layflat potential dialysate inlet and outlet ports; and, at least two layflat potential integral perfusion units enclosed inside of said potential dialysate chamber, each one of said at least two potential perfusion units being interconnected in parallel to a layflat potential common blood inlet tube and a layflat common blood outlet tube disposed inside said potential dialysate chamber, aforesaid potential common blood inlet tube and potential common blood outlet tube being interconnected to the respective aforesaid potential exterior blood inlet tube and aforesaid potential exterior blood outlet tube projecting outside of said potential dialysate chamber, each one of said potential perfusion units having a second pair of opposed thin plastic composition layflat sheets bonded together in a desired pattern including its exterior edges, each one of said perfusion units providing a potential layflat integral interconnecting blood inlet port disposed and interconnected to a potential layflat blood inlet manifold, the potential inlet manifold being disposed across and interconnected to multiple potential layflat parallel blood tubules, a potential layflat blood outlet manifold being disposed across and interconnected to the termini of the potential blood tubules opposed to the potential blood inlet manifold, a potential layflat blood outlet port being interconnected to the potential layflat blood outlet manifold at the potential manifold section opposed to the potential tubule termini, each one of said potential layflat perfusion units having their respective potential layflat blood inlet ports interconnected in parallel to said potential layflat common blood inlet tube and having their respective potential layflat blood outlet ports interconnected in parallel to said potential layflat common blood outlet tube, aforesaid second pair of thin plastic composition layflat sheets having a high permeability to waste excreta products in patient blood.

6. In the combination set forth in claim 5, the further modification wherein one layflat potential integral perfusion unit is enclosed inside of said layflat potential dialysate chamber.

7. A fabrication process for manufacturing an integral artificial kidney unit comprising:
the step of expanding an integral layflat potential artificial kidney unit of claim 5, utilizing the selected volume of heated pressurized fluid introduced into the at least two layflat perfusion units diposed between flat expansion limit plates;
the step of expanding the layflat potential dialysate chamber utilizes the selected volume of heated pressurized fluid introduces into the potential dialysate chamber disposed between flat expansion plates; and,
the step of cooling the expanded integral artificial kidney unit.

8. In the fabrication process set forth in claim 7, the further modification wherein the integral layflat potential artificial kidney unit is the artificial kidney unit of claim 6.

9. An integral layflat potential artificial kidney unit, the unit combination comprising:
a layflat potential dialysate solution chamber having an opposed first pair of layflat plastic composition sheets bonded together at all the opposed sheet perimeter, excluding the opposed sheet perimeter bonded to an opposed pair of exterior layflat potential blood outlet tube and layflat potential blood inlet tube, projecting outside said sheet perimeter, and having an opposed pair of apertures in said potential dialysate chamber directly connected to the pair of exterior layflat potential dialysate inlet and outlet ports; and,
at least one layflat potential integral perfusion unit enclosed inside of said potential dialysate chamber, each one of said at least one potential perfusion unit being interconnected in parallel to a layflat potential common blood inlet tube and a layflat common blood outlet tube disposed inside said potential dialysate chamber, aforesaid potential common blood inlet tube and potential common blood outlet tube being interconnected to the respective aforesaid potential exterior blood inlet tube and aforesaid potential exterior blood outlet tube projecting outside of said potential dialysate chamber, each one of said at least one potential perfusion unit having a second pair of opposed thin plastic composition layflat sheets bonded together in a desired pattern including its exterior edges, each one of said at least one perfusion unit providing a potential layflat integral interconnecting blood inlet port disposed and interconnected to a potential layflat blood inlet manifold, the potential inlet manifold being disposed across and interconnected to multiple potential layflat parallel blood tubules, a potential layflat blood outlet manifold being disposed across and interconnected to the termini of the potential blood tubules opposed to the potential blood inlet manifold, a potential layflat blood outlet port being interconnected to the potential layflat blood outlet manifold at the potential manifold section opposed to the potential tubule termini, each one of said at least one potential layflat perfusion unit having their respective potential layflat blood inlet ports interconnected in parallel to said potential layflat common blood inlet tube and having their respective potential layflat blood outlet ports interconnected in parallel to said potential layflat common blood outlet tube, aforesaid second pair of thin plastic composition layflat sheets having a high permeability to waste excreta products in patient blood.

10. A fabrication process for manufacturing an integral artificial kidney unit comprising:
the step of expanding an integral layflat potential artificial kidney unit of claim 9, utilizing the selected volume of pressurized liquid introduced into the at least one layflat perfusion unit;
the step of expanding the layflat potential dialysate chamber utilizes the selected volume of pressurized liquid introduced into the potential dialysate chamber; and,
the step of removing the pressurized liquid from the expanded integral artificial kidney unit.

* * * * *